[11] 3,572,934

[72] Inventor Olof Bryngdahl
Los Gatos, Calif.
[21] Appl. No. 758,535
[22] Filed Sept. 9, 1968
[45] Patented Mar. 30, 1971
[73] Assignee International Business Machines Corporation
Armonk, N.Y.

[54] LONGITUDINALLY REVERSED SHEARING INTERFEROMETRY
8 Claims, 7 Drawing Figs.
[52] U.S. Cl. .......................................... 356/106, 350/3.5
[51] Int. Cl. .......................................... G01b 9/02
[50] Field of Search.......................................... 350/3.5; 356/106, 109

[56] References Cited
OTHER REFERENCES

Stroke, G.W. et al. " Two-Beam Interometry by Successive Recording of Intensities in a Single Hologram." Applied Physics Letters. Received in Scientific Library on January 4, 1966. 6 pages

*Primary Examiner*—Ronald L. Wibert
*Assistant Examiner*—T. Major
*Attorney*—Hanifin and Jancin ABSTRACT: A type of shearing interferometry is presented in which an interferogram is formed by the object wavefront and its replica folded in the longitudinal direction. An off-axis hologram of the object is first made in a conventional manner. The hologram is then illuminated to form a real and a virtual image. The real and the virtual images are superimposed. The result is a longitudinally reversed shear interferogram which indicates twice the phase variation of the object.

Patented March 30, 1971 3,572,934

INVENTOR
OLOF BRYNGDAHL

BY Elmer Galli
ATTORNEY

LONGITUDINALLY REVERSED SHEARING INTERFEROMETRY

BACKGROUND OF THE INVENTION

1. Field of the Invention

The present invention relates to interferometry and more particularly to a method and apparatus for producing a longitudinally reversed shearing interferogram.

2. Description of the Prior Art

Shearing interferometry is a well developed science which involves interacting two similar wavefronts which have been sheared, or displaced, relative to each other. As indicated in a textbook entitled "Interferometry" by H. W. Steel, published by Cambridge University Press (1967), various types of shearing interferometry are possible. The known types include:

a. lateral shearing: the two wavefronts are displaced laterally from each other;

b. reversed shearing: the orientation of one of the wavefronts is laterally reversed relative to the orientation of the other wavefront; that is, the wavefronts are rotated 180° relative to each other;

c. radial shearing: one of the wavefronts is expanded radially relative to the other wavefront;

d. rotational shearing: one of the wavefronts is rotated relative to the other wavefront;

e. longitudinal shearing: one of the wavefronts is displaced in a longitudinal direction from the other wavefront.

Each of the above different types of shearing interferometry has certain advantages and disadvantages. The results produced by each type are not identical to the results produced by the other types and each of the various types has differing applications.

For a discussion of the various types of interferometry and their applications, reference is made to the above cited textbook and to the references cited therein.

SUMMARY OF THE INVENTION

The object of the present invention is to provide a technique and apparatus for interacting a wavefront and a replica of the wavefront which is folded in a longitudinal direction.

Another object of the present invention is to provide a method and apparatus for producing an interferogram, the lines in which represent twice the phase variation in the object.

Yet another object of the present invention is to provide a method of shearing interferometry wherein no double image of the object appears on the interferogram.

Still another object of the present invention is to provide a method and apparatus for producing interferograms, the lines or fringes in which can be made to represent any even numbered multiple of the phase variation in the object.

The above objects are achieved by employing holographic technology in a novel manner. In accordance with the present invention, a hologram of the object under test is first recorded in a conventional manner. This hologram is then used to generate two images. One image is a virtual image and this image is orthoscopic. The second image is a real image and it is reversed in depth, or pseudoscopic. These two images are interacted to produce an interferogram.

If the interferogram so produced is recorded on a photographic medium, and then used as an object to make a second shearing interferogram, lines can be generated which represent four times the phase variation in the object. The process can be repeated to generate a pattern of lines which represent any desired multiple of the phase variation in the object.

The foregoing and other objects, features and advantages of the invention will be apparent from the following more particular description of preferred embodiments of the invention, as illustrated in the accompanying drawings.

DESCRIPTION OF PREFERRED EMBODIMENT

The generation of interferograms utilizing the applicants invention requires two sequential operations. First, a hologram is generated and recorded and second, the hologram is illuminated in an appropriate system to generate the desired interferogram. The generation of the hologram will first be explained with respect to FIG. 1, and next the use of a hologram to generate an interferogram in accordance with the applicant's invention will be explained with respect to FIG. 2.

Figure 1:
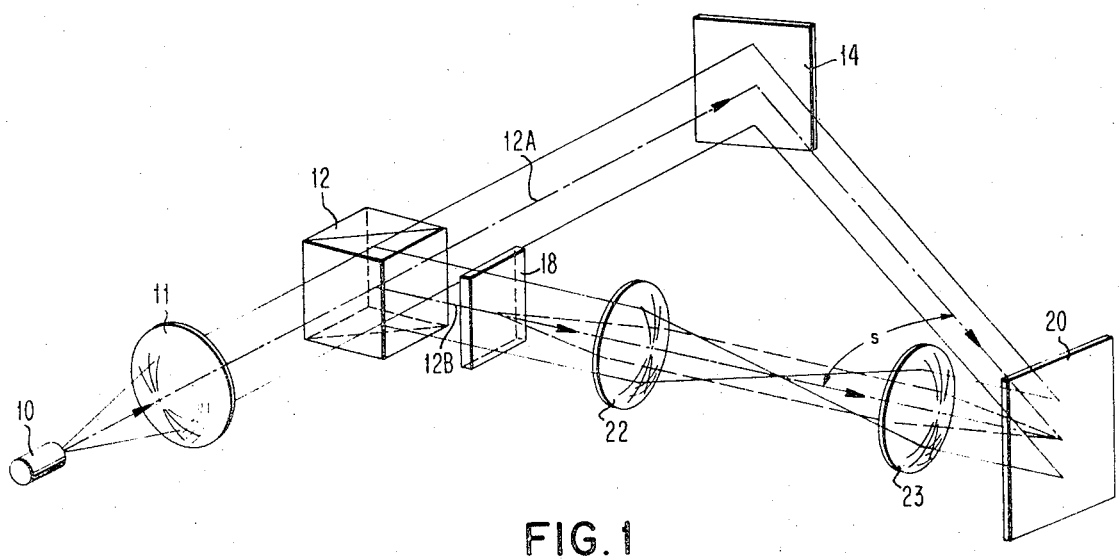
FIG. 1 shows apparatus for generating a hologram of an object.

The apparatus in FIG. 1 is conventional apparatus for generating an image hologram of an object 18. The apparatus includes a light source 10, a collimating lens 11 and a beam splitter 12. The beam splitter 12 divides the light into two beams designated 12A and 12B. The light in beam 12B is passed through object 18 and it is then interacted with the light in beam 12A to generate a hologram on recording member 20. A telecentric optical system comprising two lenses 22 and 23 is inserted in path 12B to form an image of object 18 on recording member 20. A mirror 14 is positioned in path 12A in order to direct beam 12A to recording member 20. Mirror 14 is arranged so that the separation angle designated $s$ between beams 12A and 12B is approximately 45°. The spacing of the elements is not critical with the exception that lens 22 and 23 must be positioned and have focal lengths such that an image of object 18 is created close to or on recording medium 20. The recording medium 20 can be a photographic plate such as those sold under the trade name Kodak 649-F and light source 10 can be a He-Ne laser. In order to easily record holograms, the system would also normally include a shutter; however, since such mechanization is conventional, it is not shown herein.

Figure 2:
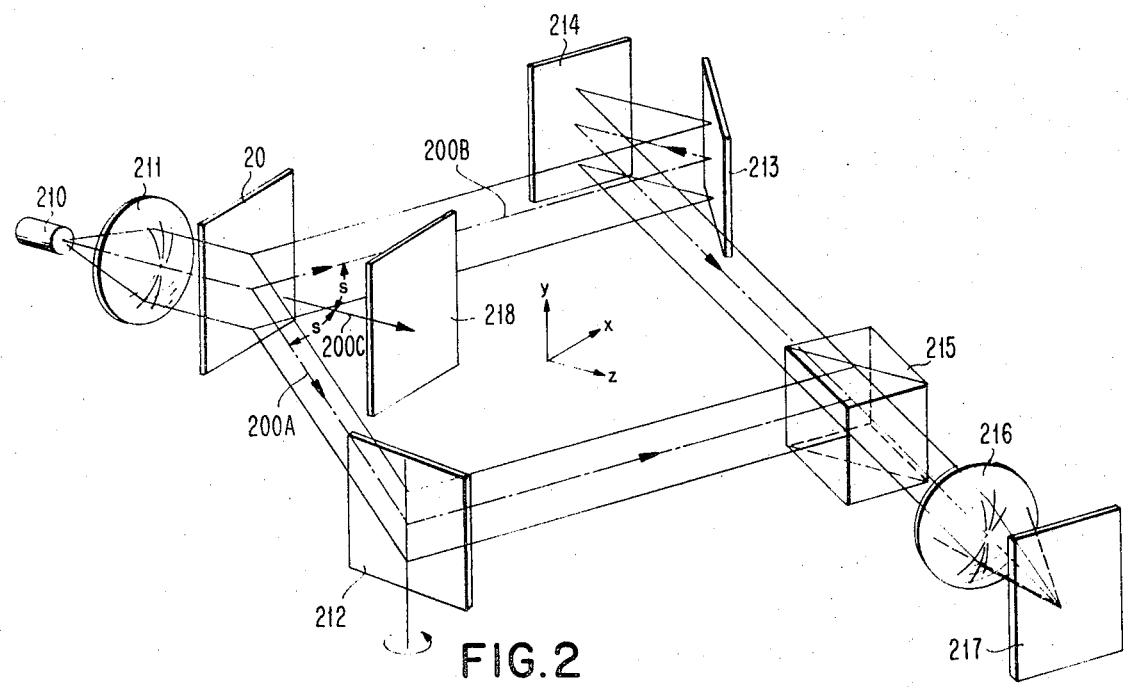
FIG. 2 shows a first embodiment of apparatus for generating longitudinally reversed shearing interferograms wherein the hologram is illuminated with a single reference beam.

After the hologram 20 is recorded utilizing the apparatus shown in FIG. 1, the photographic plate is developed, and then the hologram 20 is placed in the apparatus shown in FIG. 2. The apparatus shown in FIG. 2 includes a light source 210, and a collimating lens 211, which directs parallel light at hologram 20. When parallel light is directed at a hologram, the light passing through the hologram forms two images, one of which is orthoscopic and one of which is pseudoscopic. The apparatus shown in FIG. 2 brings these two images together in a manner that produces interferences fringes which represent twice the phase variation in the object 18 which was used to create the hologram.

The light passing through hologram 20 is divided into three beams by the diffraction produced by the hologram. These beams are 200A, 200B and 200C. The angle between beams 200A and 200B is equal to twice the separation angle $s$, which existed between beams 12A and 12B in the recording apparatus shown in FIG. 1. The light in beam 200C is the light which passes directly through the hologram. This light is of no use hence it is blocked by an opaque stop designated 218. Mirror 212 and beam splitter 215 direct beam 200A through lens 216 to screen 217. The length of the path from hologram 20 to mirror 212, to beam splitter 215, through lens 216 to screen 217 is chosen together with the focal length of lens 216 so that the plane where hologram 20 is located is imaged onto the screen 217. The light in beam 200B is directed by mirrors 213 and 214 through lens 216 to screen 217. The length of path 200B is equal to the length of path 200A such that both the light traveling along path 200A and the light traveling on path 200B images the plane of hologram 20 on screen 217. Lens 216 therefor constitutes a simple imaging system.

The light traveling along path 200B forms an orthoscopic image of object 18 on screen 217 and the light traveling on path 200A forms a pseudoscopic image of object 18 on screen 217. The light which forms these two images interferes in the plane of screen 217, thereby forming an interference pattern on screen 217. The interference pattern which is formed indicates the phase of object 18.

Mirrors 213 and 214 essentially rotate one of the images so that both the orthoscopic and pseudoscopic images which are projected onto screen 217 have the same right-left orientation. These mirrors make it possible to have the same number of right-left inversions in both path 200A and in path 200B. The effect of the right-left inversions can be seen by following the right and left sides of light rays 200A and 200B. It is noted that these are joined at beam splitter 215. If the two right-left inversions provided by mirrors 213 and 214 were not provided, the right and left sides of beams 200A and 200B would be on opposite sides when they passed through beam splitter 215. By insuring that the right-hand side of the orthoscopic image is superimposed on the right-hand side of the pseudoscopic image, one insures that each point in the interferogram corresponds to each point in the object. If the two right-left inversions were not provided, each point in the interferogram would indicate the phase difference between a point on the real image and the corresponding point on the opposite side of the virtual image.

With the apparatus shown in FIG. 2, if none of the mirrors 212, 213, 214 are tilted, the resulting pattern consisting of lines or fringes which represent lines of the same phase in the object. Between adjacent lines in the interferogram a change of phase corresponding to half a wavelength occurs. If one of the mirrors 212, 213, 214 is tiled or rotated in the direction of arrow 231, that is, about a line parallel to the $y$ axis, a fringe pattern will appear on screen 217 which represents the variation in the phase of the object. That is, the actual curvature of the lines, or fringes which appear on screen 217, will represent the variations in the phase. This is similar to the technique conventionally used in interferometry to change a fringe pattern representing equal phase to a pattern wherein the shape of the lines represents the variations in phase over the object.

Figure 3:
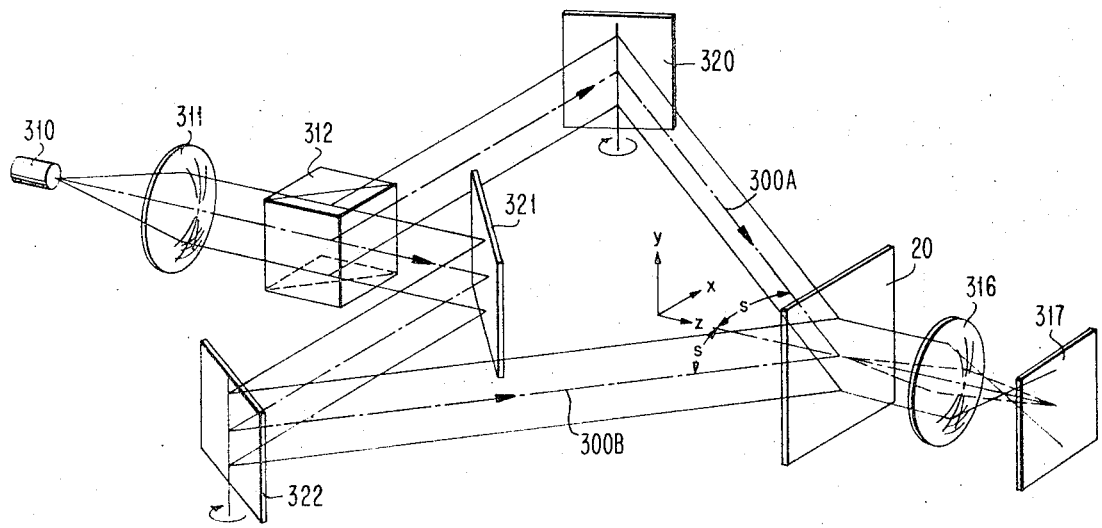
FIG. 3 shows a second embodiment of apparatus for generating longitudinally reversed shearing interferograms wherein the hologram is illuminated with two reference beams.

A second embodiment of the applicant's invention is shown in FIG. 3. In the embodiment shown in FIG. 3, the hologram 20 is illuminated with two reference beams 300A, 300B. Beams 300A and 300B are separated by an angle $2s$. Each of these reference beams generates two images; however, only the orthoscopic image generated by reference beam 300A and the pseudoscopic image generated by reference beam 300B is used.

Lens 316 forms an image of plane 20 in the plane of screen 317. The angle between the axis of lens 316 and the axis of each of the beams 300A and 300B is equal to the angle between beams 12A and 12B used during the recording process. This insures that lens 316 projects the orthoscopic image produced by beam 300A and the pseudoscopic image produced by beam 300B onto screen 317. The two images projected onto screen 317 interfere in the same manner as the two images generated by the embodiment shown in FIG. 2 interfered to produce interference fringes. With the embodiment shown in FIG. 3, the two images are oriented in the same direction and no rotation is necessary.

Reference beams 300A and 300B are generated by a light source 310, a collimating lens 311, a beam splitter 312, and three mirrors 320, 321, 322. As in the first embodiment, one of the mirrors, for example mirror 322 can be rotated about a line parallel to the $y$ axis in order to generate a fringe pattern the shape of which represents the variation in phase of object 20.

Figure 4:
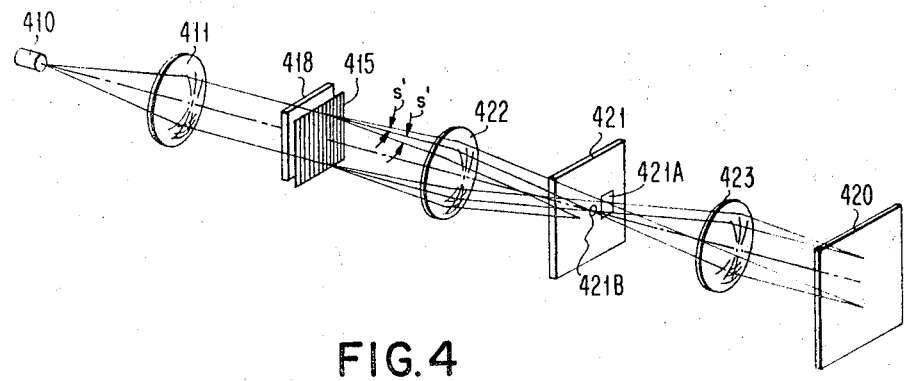
FIG. 4 shows a second embodiment of apparatus for generating a hologram.
Figure 5:
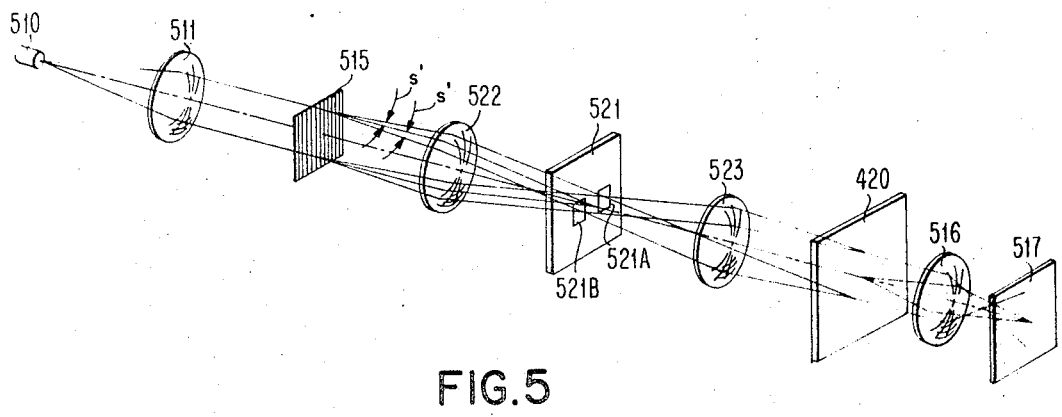
FIG. 5 shows apparatus for generating longitudinally reversed shearing interferograms from the holograms recorded using the apparatus shown in FIG. 4.

A third embodiment of the applicant's invention is shown in FIGS. 4 and 5. FIG. 4 illustrates apparatus for recording a hologram in accordance with this third embodiment of the applicant's invention, and FIG. 5 shows apparatus for using this hologram to generate interference fringes. Utilizing the apparatus shown in FIG. 4, an object 418 is illuminated with parallel light rays generated by light source 410 and collimating lens 411. The two beams necessary to generate a hologram are generated by placing a diffraction grating (Ronchi Ruling) 415 directly behind the object 418. A telecentric lens system, comprising lenses 422 and 423, projects images of object 418 onto recording medium 420. A mask 421 is positioned in the Fraunhofer diffraction plane of lens 418. Mask 421 is opaque except for two openings 421A and 421B. Opening 421A passes one of the first order diffraction patterns generated by grating 415. Opening 421B passes the center of the zeroth order diffraction pattern; that is, opening 421B is a "pin hole" located on the optical axis. Mask 421 blocks all of the diffraction patterns except the one first order diffraction pattern which passes through opening 421A and the center of the zeroth order diffraction pattern which passes through opening 421B.

The light passing through opening 421A interacts with the light passing through opening 421B to form a hologram on photographic medium 420. The light passing through opening 421B is used as a reference beam similar to beam 12A in FIG. 1. The light passing opening 412A carries an image of object 418 similar to beam 12B in FIG. 1. The separation angle between these beams is designated $s'$. Naturally, in a practical system, a shutter might be included to make the operation simpler; however, such mechanism is conventional and is not shown herein.

In order to generate interference fringes, the hologram 420 is developed and placed in the mechanism shown in FIG. 5. The mechanism shown in FIG. 5 is similar to the mechanism shown in FIG. 4 with the exception that (1) it does not include object 418 (2) mask 421 has been replaced by mask 521 and (3) an imaging system which includes lens 516 and screen 517 has been added. Mask 521 has two openings, 521A, 521B. These openings pass both of the first order diffraction patterns produced by grating 515. Each of these two beams strike hologram 420 and produce two images in the same way that beams 300A and 300B, shown in FIG. 3, produce images which interact to produce the desired interference fringes. In the embodiment shown in FIG. 3, reference beams 300A and 300B are separated by twice the separation angle $s$. In the system shown in FIG. 5, the two beams passing through openings 521A and 521B are likewise separated by two times the separation angle $s'$ which existed between the two beams passing through openings 421A and 421B during the recording step.

Multiple fringe interferograms can be produced if a tilt between the interfering wavefronts is introduced. This can be accomplished by slightly rotating hologram 420 about a line perpendicular to the optical axis.

Figure 6:
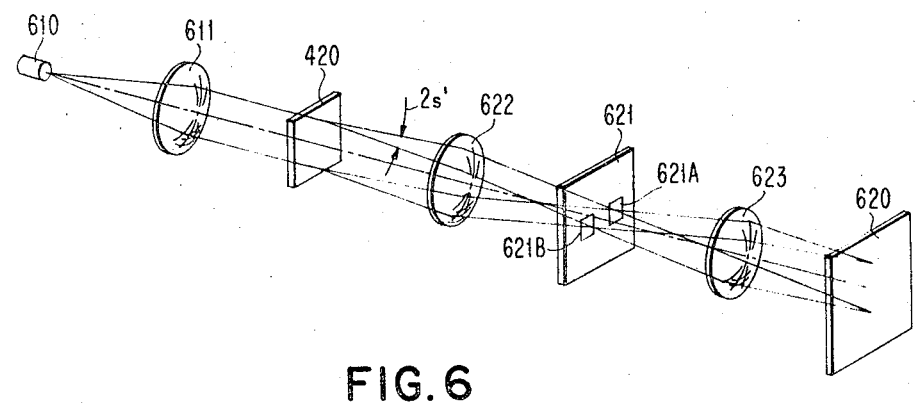
FIGS. 6 and 7 show apparatus for generating interferograms, the lines in which can be made to represent any desired even numbered multiple of the phase variation in the object.
Figure 7:
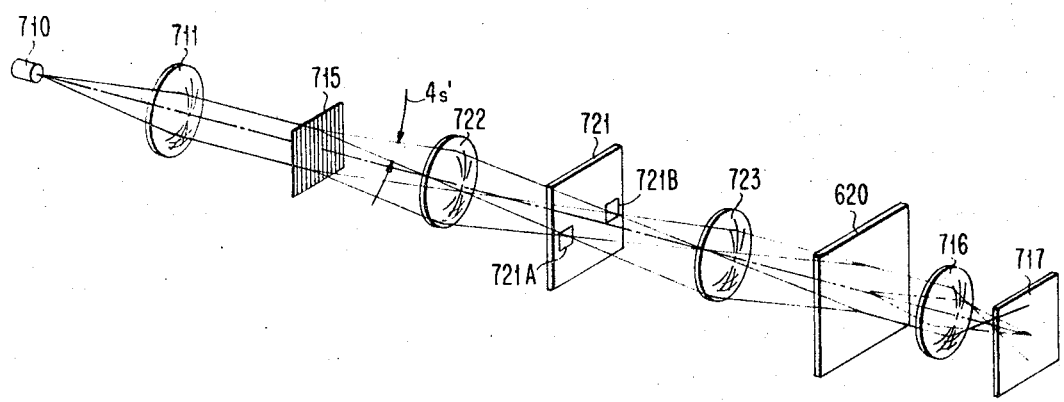

Holograms which have fringes representing any even numbered multiple of the phase variation of object 418 can be obtained using the apparatus shown in FIGS. 6 and 7. A first hologram 420 is recorded utilizing the apparatus shown in FIG. 4 in exactly the previously explained manner. Then the hologram 420 is placed in the apparatus shown in FIG. 6 and a second hologram 620 is recorded. The apparatus shown in FIG. 6 is the same as the apparatus shown in FIG. 4 with the exceptions that (1) grating 415 has been eliminated (2) object 418 is replaced by hologram 420 and (3) mask 421 is replaced by mask 621 which has two openings 621A and 621B which pass both first order diffraction patterns. The second hologram 620 is therefore recorded with a separation angle of $2s'$. The diffraction is produced by the lines in hologram 420. The lines in hologram 420 are close enough together that they act like a diffraction grating.

Light source 610, lenses 611, 622 and 623, the recording medium 620 and the spacing of the various elements is similar to the embodiment shown in FIG. 4. After hologram 620 has been recorded using the apparatus shown in FIG. 6, it is developed in a conventional manner and then placed in the apparatus shown in FIG. 7.

The apparatus shown in FIG. 7 is similar to the apparatus shown in FIG. 5 with the exception that mask 521 has been replaced by a mask 721 which has two openings 721A and 721B which allow the second order diffraction patterns generated by grating 715 to pass. Light source 710, lenses 711, 716, 722 and 723, grating 715 and screen 717 can be identical to those shown in FIG. 5 and previously explained. Using the apparatus shown in FIG. 7, hologram 620 is therefore illuminated with two beams which have a separation angle of $4s'$. Thus hologram 620 is recorded with a separation angle of $2s'$ in the apparatus shown in FIG. 6 and it is illuminated with a separation angle of $4s'$ using the apparatus shown in FIG. 7. The apparatus shown in FIG. 7 generates two images which interfere in the same manner as the previously explained embodiments. However, since hologram 620 was made from hologram 420 which in turn was made from object 418, the fringes generated when hologram 620 is illuminated as shown in FIG. 7, represent four times the phase variation in object 418. The mathematical reason for this is explained hereinafter. It is noted that the apparatus shown in FIG. 6 could be used to make another hologram 620' from hologram 620. When such a hologram 620' is illuminated using the apparatus shown in FIG. 7, the resulting interferogram will have lines indicating six times the phase variation in the object 418. The recording steps above defined can be repeated any number of times to obtain any multiple of the phase variation of object 418.

The generation of holograms having fringes which represent greater than two times the phase variation can also be generated in the following manner. First, an image hologram is made using the apparatus shown in FIG. 4. Next, this hologram is processed and developed in a nonlinear way such that higher diffraction orders in which the phase is amplified are enhanced. The introduction of any type of nonlinearity during the developing process will produce this result. Finally, the hologram should be illuminated in a system similar to that shown in FIG. 7 wherein mask 721 passes both second order diffraction patterns. The interference pattern that results on screen 517 will be a longitudinally reversed shear interferogram with four times phase multiplication. Alternatively, the plus and minus third diffraction order could form an interferogram with six times phase multiplication, etc.

When small object reference wave angles are used as in the apparatus shown in FIGS. 4, 5, 6 and 7, unwanted light distributions are displayed in reconstruction close to the desired interferogram. These may be filtered out if so desired in the diffraction plane of the optical system which is used to image the hologram onto the screens 517 and 717.

The systems shown in FIG. 3 includes an imaging system comprising lens 316 and the system shown in FIG. 5 includes an imaging system comprising lens 516. These imaging systems facilitate the recording of interference patterns in that screens 317 and 517 can be replaced with photographic film in order to record the interferograms which are produced; however, if one merely wants to observe the holograms and one does not care to record them, lenses 316 and 516 and screens 317, 517 and 717 can be eliminated. If these lens systems are eliminated, the interferograms will appear directly in the plane of the original holograms 20, 420 and 620. The system shown in FIG. 2 does require lens 216 since one must observe the interferogram in an image plane which is removed from the hologram plane in order to make it possible to do the right-left inversion which is accomplished by mirrors 213 and 214.

The operation of the applicant's invention can be explained mathematically as follows:

When a hologram is illuminated with a reference wave, a real image and a virtual image are produced. The virtual image is a replica of the object wave $u(x,y,z)$, and it is orthoscopic, while the real image $$U^*(x,y,-z) \quad (1)$$

is reversed in depth, or pseudoscopic. In the above expressions, $z$ is the normal distance from the hologram plane to the object under test.

The amplitude transmittance of a hologram taken in the diffraction field $v$ of the object $u$ with a plane off-axis reference wave $e^{i\alpha x}$ is proportional to $$|v+e^{i\alpha x}|^2 = vv^*+1+ve^{-i\alpha x}+v^*e^{i\alpha x} \quad (2)$$

where the asterisk indicates the complex conjugate value. Using the previously described apparatus, the hologram is illuminated with two plane waves, $e^{i\alpha x}$ and $e^{i1\alpha x}$, at the same time.

As a result, we produce two waves $v$ and $v^*$ which leave the hologram in the same direction resulting in the following wavefronts:

$$(e^{i\alpha x}+e^{i1\alpha x})(vv^*+1+ve^{-i\alpha x}+v^*e^{i\alpha x})=$$
$$v+v^*+(vv^*+1)e^x+(vv^*+1)e^{i\alpha x}+$$
$$v^*e^{i2\alpha x}+ve^{i12\alpha x}. \quad (3)$$

The intensity $$I=|ae^{i\varphi}+ae^{1i\varphi}|^2 = a^2|e^{i2\varphi}+1|^2 \quad (4)$$

is displayed in the hologram plane in case of an object $ae^i$. For a three-dimensional object, the reversal in depth takes place around that plane in the object which is focused onto the hologram. Equation (4) may be written as $$I=a|e^{i2\varphi}+1|^2=4a^2\cos^2\Phi \quad (5)$$

and, thus, destructive interference will occur for $\Phi=(2p+1)\pi/2$, where $p$ is an integer.

If we want to display the variation in phase over the object, a tilt of one of the reconstructed wavefronts can be introduced by tilting one of the illuminating waves so that $e^{i(\alpha-\beta)x}$ and $e^{i1\alpha x}$, where $\beta \ll \alpha$, illuminate the hologram. Then the interferogram obtained is:

$$I=|ae^{i(\varphi-\beta x)}+ae^{i\varphi}|^2=$$
$$a^2|e^{i(2\varphi-\beta x)}+1|^2 \quad (6)$$

and interference fringes occur where $$2\Phi=\beta x+(2p+1)\pi. \quad (7)$$

Equations (5) and (7) show that twice the phase of the object is displayed in this type of shearing interferogram. This property is especially useful when investigating objects with small phase variations. A phase multiplication greater than 2 is obtained when a new hologram is made from the first one as previously explained. The following expression defines amplitude transmittance to the second hologram 620 which is made from hologram 420 as previously explained:

$$|exp[i(\Phi\alpha x)]+exp[-i(\Phi\alpha x)]|^2=$$
$$1+exp[i2(\Phi-\alpha x)]+exp[-i2(\Phi-\alpha x)],$$

where $exp(i\Phi exp(i\alpha x)$ its deflection off the hologram axis. In reconstruction, as previously explained, a mask is used which only passes both second diffraction orders. The result is that an interferogram is formed which is defined by the following expression:

$$I=|exp(i4\Phi)+1|^2$$

Note that this hologram displays four times the phase of the object.

As shown herein the holograms are made by transmitting light through object 418. The present invention could also be used to generate interferograms of reflective objects. The only difference would be that when the hologram is made from reflective objects an optical system would be used which reflected light from the object and then imaged the reflected light onto the hologram plane along with a reference beam in order to generate the hologram. It is also noted that the frequency of the light used affects interferograms made in accordance with this invention in the same manner as it affects conventional interferograms.

The embodiments of the invention shown herein use image holography. The invention could also be practiced by other types of holography, such as holography which uses Fraunhofer diffraction. In this case, during the recording step a Fraunhofer diffraction pattern of the object would be projected onto the recording medium. In the read out process, a Fourier transformation is necessary between the hologram and the plane where the interferogram is finally displayed. A system such as that shown in FIG. 2 would be used during read out with the following changes (1) the focal length of lens 216 would be coordinated with the length of the various paths over which the light travels so that a Fourier transformation is performed between hologram 20 on screen 217 and (2) an image rotator such as a telecentric cylindrical lens system would be placed in path 200A to rotate one of the images by 180 degrees relative to the other image.

While the invention has been particularly shown and described with reference to preferred embodiments thereof, it will be understood by those skilled in the art that the foregoing and other changes in the form and details may be made therein without departing from the spirit and scope of the invention.

I claim:

1. The method of generating longitudinally reversed shear interferogram comprising:
   generating a hologram of an object using two light beams separated by an angle $s$;
   simultaneously illuminating said hologram with two light beams separated by an angle $2s$;
   interacting the coincident real and virtual images so generated to produce an interferogram the fringe pattern in which represents twice the phase of said object.

2. The method of generating a longitudinally reversed shear interferogram comprising:
   generating a hologram from said object;
   generating in substantially the same plane and along the same optical axis a real and a virtual image from said hologram, said real image being orthoscopic and said virtual image being pseudoscopic; and
   interacting said images to produce an interferogram indicative of differences between said orthoscopic and pseudoscopic images of said object.

3. The method recited in claim 2, wherein the step generating said real and virtual images is by illuminating said hologram with a single light beam.

4. The method recited in claim 2, wherein the step of generating said real and virtual images is by illuminating said holograms with a single beam, and including the step of rotating said images relative to each other to orient both of said images in the same direction.

5. The method recited in claim 2, wherein the generating of said hologram is by using two beams separated by an angle $s$, and the step of generating said images is by directing two reference beams at said hologram, said beams being separated by an angle $2s$.

6. The method recited in claim 1, wherein said two beams used in generating said hologram are generated by passing light through said object and through a diffraction grating producing a diffraction pattern having a plurality of orders, the light in two different diffraction orders being interacted to form said hologram.

7. The method recited in claim 6, wherein said two beams for illuminating said hologram are generated by passing light through a diffraction grating generating a diffraction pattern having a plurality of diffraction orders, choosing two of said orders for illuminating said hologram, the diffraction orders selected for illuminating said hologram being separated by twice the angle of the diffraction orders used in generating said hologram.

8. The method recited in claim 2, wherein the fringe pattern in said interferogram is made to represent more than twice the phase of said object by the steps of:
   making a second hologram from said hologram generated from said object by generating from said hologram a diffraction pattern having a plurality of diffraction orders; and
   interacting two of said diffraction orders to generate said second hologram, and generating said interferogram by illuminating said second hologram with two light beams separated by twice the angle of the light beams used in generating said second hologram.